Feb. 3, 1942.  L. C. HOLLAND  2,272,003
CLUTCH BAND
Filed Feb. 25, 1941   2 Sheets-Sheet 1

Inventor
Lowell C. Holland
By Clarence A. O'Brien
Attorney

Feb. 3, 1942.    L. C. HOLLAND    2,272,003
CLUTCH BAND
Filed Feb. 25, 1941    2 Sheets-Sheet 2

Inventor
Lowell C. Holland
By Clarence A. O'Brien
Attorney

Patented Feb. 3, 1942

2,272,003

UNITED STATES PATENT OFFICE 2,272,003

CLUTCH BAND

Lowell C. Holland, Lexington, Nebr.

Application February 25, 1941, Serial No. 380,536

2 Claims. (Cl. 192—107)

My invention relates to improvements in clutch bands for frictionally gripping a rotating or a non-rotating machine element to clutch the same.

The invention is directed toward providing a simply constructed band of this character particularly designed for gradual and uniform gripping action, quick and easy replacement of parts, long life, and economy in manufacture.

Other and subordinate objects are also comprehended by my invention, all of which, together with the precise nature of my improvement, will be readily understood when the succeeding description and claims are read with reference to the drawings accompanying and forming part of this specification.

Figure 1:
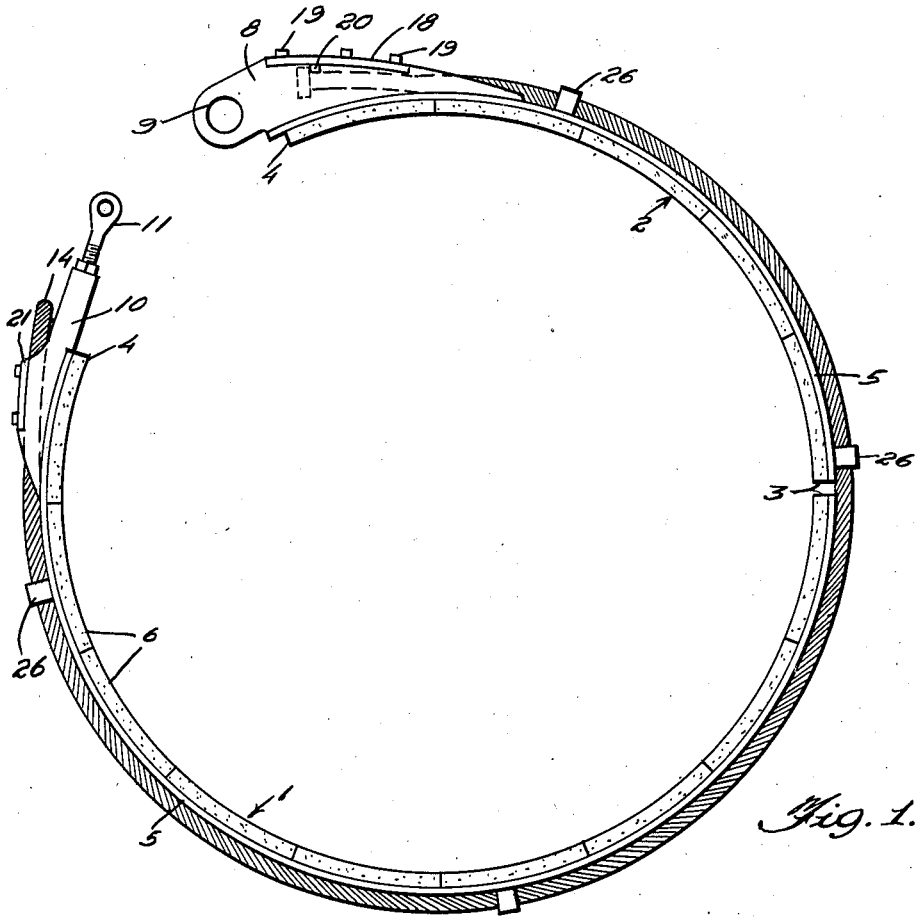
Figure 1 is a view in side elevation of a preferred form of my invention.
Figure 2:
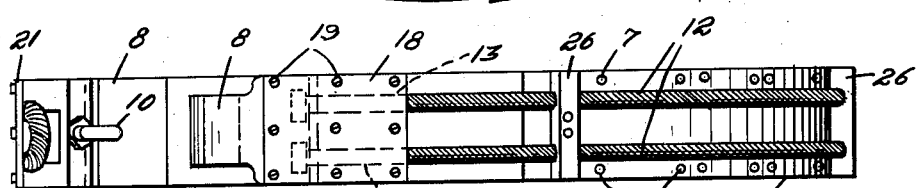
Figure 2 is a view in plan.
Figure 3:
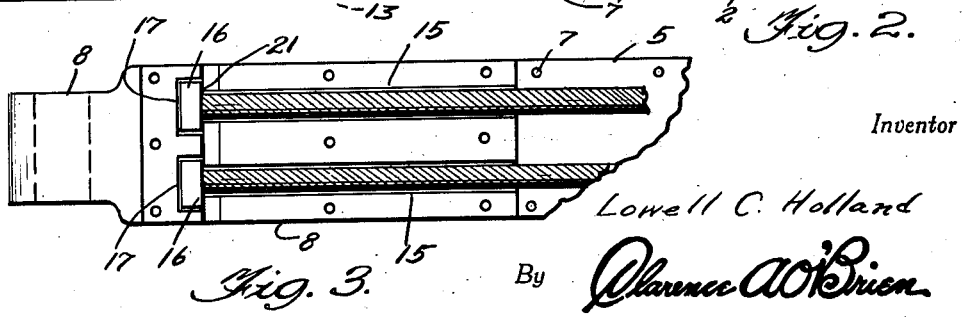
Figure 4:
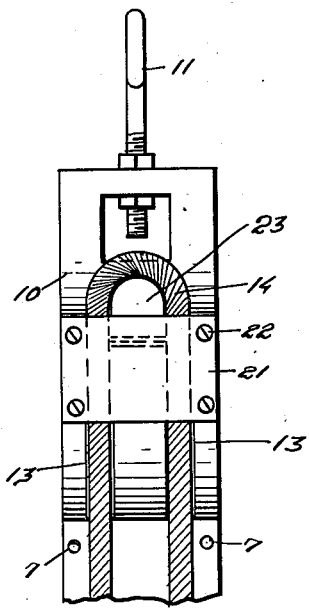
Figure 5:
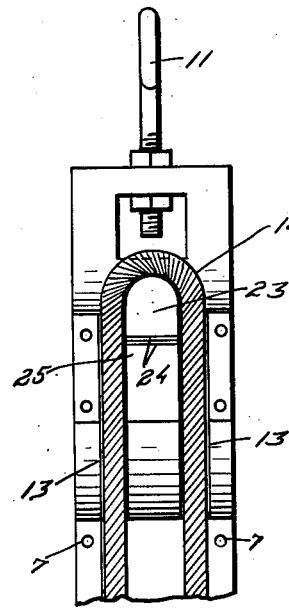
Figure 6:
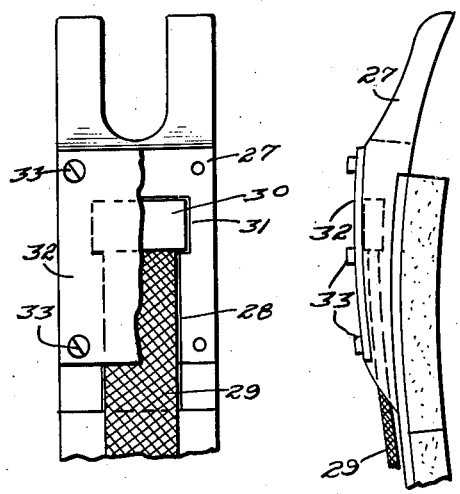
Figure 7:
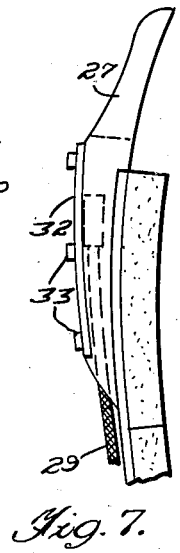
Figures 8, 9:
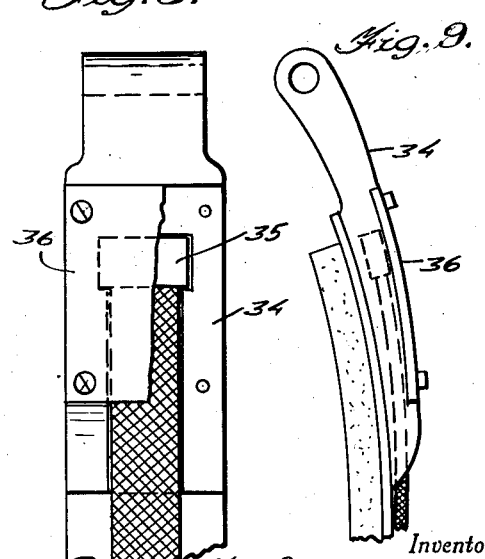

Figure 3 is a fragmentary view in plan of the attached end of the band drawn to an enlarged scale and with the keeper plate detached, Figure 4 is a fragmentary face view of the free end of the band, Figure 5 is a similar view with the keeper plate detached, Figure 6 is a fragmentary face view of the free end of the band equipped with a modified form of cable, Figure 7 is a fragmentary view in side elevation of said free end of the band further illustrating the modified form of cable, and Figure 8 is a fragmentary view of the attached end of the band equipped with the modified form of cable, and Figure 9 is a fragmentary view in side elevation of the attached end of the band equipped with said modified form of cable.

Referring to the drawings by numerals, the band of my invention, in its preferred embodiment, comprises an arcuate section 1 and a relatively shorter, arcuate section 2 arranged end to end to form a broken annulus with inner ends 3 of the sections spaced apart in contiguous relation and outer free ends 4 of the sections spaced further apart.

Each section 1, 2, comprises an arcuate strip-like shoe 5 of a suitable resilient metal having an internal facing of any suitable friction gripping material, such as brake lining, attached to the shoe in sections 6 spaced longitudinally of the shoe, the attaching means preferably comprising rivets 7 spaced along the side edges of the shoe.

Fitted on the free end of the shoe 5 of the shorter section 2, on the outer face thereof, is a coupling block 8 extending beyond said end for a suitable distance and provided with a lateral front end bore 9 therein by means of which the band may be pivoted on a pin, not shown, for anchoring or attaching the same in position upon the machine part to which it is to be connected. The outer side of the block 8 is bevelled to the section 2 for a purpose presently seen. Similarly fitted on the free end of the shoe 5 of the longer section 1 is a similar coupling block 10 but having an end eye bolt 11 for the connection thereto of a suitable operating mechanism, not shown, for tightening said band around the machine part to be clutched. The coupling block 8 is detached from the shoe 5, whereas, the coupling block 10 is attached to its shoe 5 by welding, not shown.

The described sections 1, 2, are connected together by a flexible connection comprising a steel cable anchored to the coupling blocks 8, 10, to provide a pair of stretches 12 extending side by side around the outer faces of the shoes 5 and parallel with the side edges thereof. For this purpose the coupling block 10 is provided with a pair of longitudinally extending, laterally spaced, grooves 13 in the outer face thereof and the cable is looped, as at 14, to form the stretches 12 and the latter trained through said grooves 13, said stretches extending around said sections 1, 2, to the coupling block 8 to which the terminal ends of the cable are connected as follows. A pair of grooves 15, similar to grooves 13 are provided in the outer face of the coupling block 8 through which the ends of the stretches 12 are trained. Flat terminal heads 16 are provided on said stretches 12 which seat in notches, or sockets, 17 provided in the coupling block 8 at the outer ends of said grooves 13 and whereby said stretches are anchored against pulling out of said grooves 15. A flat keeper plate 18 is secured, as by screws 19 on the coupling block 8 over the grooves 15, notches 17 and heads 16, said plate having a transverse bottom rib 20 thereon engaging behind the heads 16 to further anchor the same in position.

Returning now to the coupling block 10, a flat keeper plate 21 is secured by screws 22 to the outer face of said block over the grooves 13 and stretches 12 to retain the latter in said grooves. The bight of the loop 14 is trained around an arch-shaped anchor block 23 slidably interposed between the coupling block 10 and the keeper plate 21 in advance of the grooves 13 with shim plates 24 interposed between the same and an abutment 25 formed on said block. The purpose of the shim plates will presently appear.

For securing the sections 1, 2, to the stretches 12 of the cable, circumferentially spaced apertured cleats 26 are provided on the outer faces of the sections through which the cable stretches 12 are slidably extended.

As will now be seen, pull exerted on the eye-bolt 11 will be transmitted to the cable stretches 12 through the anchor block 23 to tighten the sections 1, 2, around the element to be clutched, the stretches 12 sliding through the cleats 26 so that pressure is applied to said sections 1, 2, gradually and uniformly. Because of the looping of the cable around the anchor block 23, said cable is free to slide around the same and thereby equalize the pull on the stretches 12 and pressure on the sections 1, 2, at both sides of the band. The stretch of the cable may be compensated for by inserting thicker, or additional, shim plates between the anchor block 23 and abutment 25. The eye-bolt 11 is threaded into the block 10 for adjustment to tighten the band if desired in a manner which will be clear.

In the modified form of the invention shown in Figures 6 and 7, a coupling block 27, corresponding to block 10, is provided with the exception that the block has a single groove 28 therein for the extension therethrough of a flat steel cable 29 to be used in lieu of the cable previously described, said cable 29 having a flat head end 30 fitting in a socket 31 provided in said block in advance of the groove 28, said groove 28, head 30 and socket 31 being covered by a keeper plate 32 attached to the same by screws 33.

In Figures 8 and 9, a coupling block 34 is provided corresponding to coupling block 8 and which is constructed in the same manner as coupling block 27 for anchoring the other head end 35 of the flat steel cable 29 thereto, said block 34 being provided with a keeper plate 36 similar to plate 32.

The advantage of the flat steel cable 29 is that it is subject to less stretch than the first described cable.

The foregoing will, it is believed, suffice to impart a clear understanding of my invention without further explanation.

Manifestly the invention is susceptible of modification in other respects than as disclosed without departing from the inventive concept, and right is herein reserved to such other modifications as fall within the scope of the subjoined claims.

What I claim is:

1. A clutch band comprising a pair of arcuate strip-like shoes internally lined and disposed end to end to form a broken annulus with outer ends spaced apart, a pair of coupling blocks on the outer ends of said shoes, respectively, opposed to the outer faces thereof, and a looped cable connecting said blocks together, said looped cable extending around said shoes along each side edge thereof and terminating in a pair of enlarged end heads, the loop of said cable slidably extending through one block and being confined therein, and the other block having a pair of grooves therein through which said ends of the cable are trained, said grooves terminating in a pair of sockets seating said heads, and a keeper plate secured to said other block and retaining the ends of the cable and heads in the grooves and sockets, respectively.

2. A clutch band comprising a pair of arcuate strip-like shoes disposed end to end to form a broken annulus with outer ends spaced apart, a pair of coupling blocks on the outer ends of said shoes, respectively, opposed to the outer faces thereof, and a looped cable connecting said blocks together said cable extending around said shoes along each side edge thereof and terminating in ends anchored to one of said blocks, the loop of said cable being slidably extended through the other block and the latter having an abutment thereon, an anchor block fitted in the looped end of said cable between the same and said abutment, and shim plates interposed between said block and abutment.

LOWELL C. HOLLAND.